Figure 1:
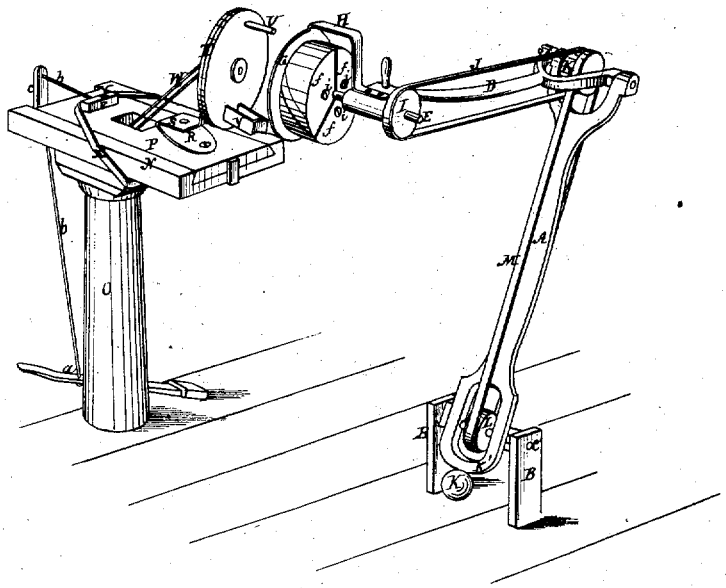

S. H. HODGES.

Machine for Trimming and Burnishing Soles.

No. 5,183. Reissued Dec. 10, 1872.

*Witnesses.*

John Buckley

Minot Minthorn

*Inventor.*

Samuel H. Hodges by A. Pollok his Atty.

UNITED STATES PATENT OFFICE.

SAMUEL HORATIO HODGES, OF LYNN, MASSACHUSETTS, ASSIGNOR, BY MESNE ASSIGNMENTS, TO J. W. ABBOTT, TRUSTEE, OF THE HODGES TRIMMING AND EDGE-SETTING MACHINE ASSOCIATION, OF SAME PLACE.

IMPROVEMENT IN MACHINES FOR TRIMMING AND BURNISHING SOLES.

Specification forming part of Letters Patent No. 117,287, dated July 25, 1871; reissue No. 5,183, dated December 10, 1872.

*To all whom it may concern:*

Be it known that I, SAMUEL H. HODGES, of Lynn, in the county of Essex and State of Massachusetts, have invented certain new and useful Improvements in Trimming and Burnishing Machines for Boots and Shoes, of which the following is a specification:

My invention relates to the method of moving and operating the burnishing or trimming tool by machinery, or by machinery aided by the hand of the operator. In these functions of the machine I have endeavored to substitute for the mere hands, and without changing their essential functions, machinery guided and controlled by hand, whereby the work can be done more perfectly and more expeditiously than either by hand or by mere automatic machinery. Thus, in hand burnishing or trimming the hand is the tool-holder, and it is operated by the arm, which forms a fixed joint at the shoulder and a movable joint at the elbow; the work is held upright, so that the hand can sweep longitudinally back and forth along the curved edge of the sole, yielding laterally to the few and slight sinuosities of the sole. So in my machine the tool-holder is operated by a double lever having a fixed and a movable fulcrum corresponding, respectively, to the shoulder and elbow, and is thus capable of sweeping along the curved surface of the sole-edge, and, in combination with such tool-holder and system of levers, a jack is used, presenting the work to the tool in substantially the same manner as it is held by the hand burnisher or trimmer, namely, in the plane or a plane parallel substantially with the plane of the levers.

To provide for the depressions or sinuosities or inclinations in the face of the sole I attach the jack to its support or frame in such manner as to adapt itself or yield according to the irregularities of the work without, however, materially disturbing the essential character of parallelism above indicated of the jack or sole plane with the plane in which the levers operate.

In the organization of machinery in accordance with my said invention, I have found it important, in order to insure perfect work, particularly in burnishing, to so arrange the tool-actuating mechanism as to allow the tool while performing its functions to drop with its weight or any weight that might be given it, upon the work. The tool, however, should be provided with a handle or means whereby the operator may guide it, increase, or relieve its pressure according to the requirements of the work.

My invention, therefore, consists in the combination, with a jack or holder for supporting the boot or shoe, of a trimming or burnishing tool mounted on a flexible or jointed frame or arms, operating substantially in the manner hereinafter described, so that the trimming or burnishing tool may, by means of said frame or arms, be brought to bear with requisite pressure at any desired point or angle upon the edge or bottom of the sole or heel of the boot or shoe held in or by the jack, substantially as hereinafter shown and described. My invention further consists in the combination of a jack or holder for supporting the boot or shoe with a burnishing or trimming tool carried by levers jointed so as to move in the plane of, or a plane parallel with, the sole of the shoe or boot, substantially as hereinafter shown and described. My invention further consists in the combination of a jack and a burnishing or trimming tool and its carrying-frame, the latter being composed of two jointed levers, one of which has a fixed center of oscillation. My invention further consists in the combination, with a trimming or burnishing tool operated by jointed levers, as hereinafter shown and described, of a jack capable of being shifted upon a horizontal axis, and so holding the shoe as to present the sole to the action of the tool in an upright position. My invention further consists in the combination, with a trimming or burnishing tool operated by jointed levers, as herein shown and described, of a jack capable of being shifted upon both a horizontal and vertical axis, substantially as herein shown and described, so that the tool may act upon the various portions of the sole-edge and conform to its curves and depressions, substantially as hereinafter shown and described. My invention further consists in the combination, with a revolving burnishing or trimming tool, of jointed tool-carrying levers or frame provided with a system of pulleys and belts, or the mechanical equivalent thereof, under the arrangement substantially as hereinafter shown and described, whereby the frame may be moved up and down and back and forth while movement is transmitted from some prime mover to the tool through the medium of said pulleys and belts, or their mechanical equivalent; and my invention further consists in the construction of the frame composed of levers forked at their joints and united by shafts upon which the pulleys of transmission are mounted; and my invention further consists in the combination, with the jointed tool-carrying frame, of a handle applied to the head of the frame or link upon which the tool is mounted; and my invention further consists in the peculiar construction of the cutters, frame, and other parts of the machine.

The manner in which my invention is or may be carried into effect will be readily understood by reference to the accompanying drawing, in which—

Figure 3:
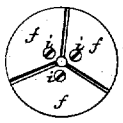
Figure 2:
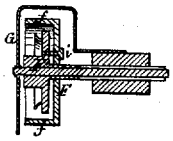

Figure 1 is a perspective view of an apparatus made in accordance with my invention. Fig. 3 is a side of the particular cutter, which, in this instance, I have represented as mounted on the flexible or jointed tool-carrying frame. Fig. 2 is a transverse vertical section of said cutter.

The flexible or jointed tool-carrying frame consists, in this instance, of two arms, A and D, from which I am enabled to obtain all the movements needed to bring the tool to bear upon any desired portion of the work. The lower end of the arm A is pivoted to standards B by the shaft C. Within the forked upper end of the arm A is pivoted the second arm D, which is also forked at this pivoted end. In the outer or free end of the arm D the cutting or burnishing tool is mounted. The tool is here shown to be rotary, being mounted upon the shaft E, deriving its motion from a pulley, I, which communicates by belting J with a pulley, K, mounted on the shaft connecting the forked ends of the two arms A and D. The pulley K is connected by belting M with a pulley, L, on shaft C; and the latter is revolved by some suitable power or prime mover. In this way motion is readily communicated to the cutter or other tool mounted on the shaft E. It is manifest, however, that motion may be communicated to the tool in other ways, and that the movement of the tool need not necessarily be rotary, but may be reciprocatory. For instance, the tool may be mounted on a sliding carriage or holder held in ways or grooves formed on the free end of the arm D, and this holder may be connected by a rod with an eccentric on the shaft connecting the arms, so that when the shaft is rotated by the pulley K a reciprocating movement will be imparted to the tool-holder through the medium of the eccentric and connecting-rod. The details of construction of the flexible frame may also be varied, and it may be constructed to swing on a universal joint, so as to give motion in all directions to the tool, all that is required being that the tool should have such freedom of motion as to permit it to be brought to bear upon any part of the shoe where its services are required. A handle, *d*, on the extremity of the upper part or head of the frame, enables the operator to guide the movements of the frame and tool. With the tool and tool-carrying frame, when thus arranged to operate, I combine a jack, holder, or other suitable support for the shoe or boot, by means of which the work may be properly presented to and sustained under the action of the trimming or burnishing tool carried by the frame. Owing to the flexible or jointed arrangement of the frame and the freedom of motion which it allows the tool, the machine is adapted to receive a burnishing as well as a cutting instrument, and may be used equally as well for either operation, thus uniting in itself the qualifications of both a trimming and burnishing apparatus. Any suitable cutting or burnishing tool, and any suitable jack or support for the shoe, may be employed. I have, however, represented in the drawing a jack and jack-operating mechanism, and a cutter, the construction and arrangement of which, in some respects, are peculiar, and these I shall therefore proceed to describe, so that the manner in which they operate together in connection with the flexible frame may be understood; although I do not limit myself to the combination of the flexible frame with a jack and cutting-tool of such peculiar construction. The revolving cutter F on the end of the shaft E is composed of three sections, *f f f*, each of which is held, independently of the others, to a flange, F′, by a screw, *i*, the said screws passing through their respective sections near the shaft E. The sections are provided with diagonal cutting-edges *f′*, and have spaces between them to let the chips or shavings through, somewhat after the manner of a plane-iron. The flange F′ is sleeved on the shaft E, the sleeve being provided with a clutch, *e*, which engages with a corresponding clutch on the shaft E. This arrangement allows the cutter-disk F to be removed from shaft E, and an emery wheel or other cutting or finishing instrument substituted. G represents a circular guard or shield, which is attached to arm E by means of the bent strap H, and projects over one side of the revolving cutter-disk F. N represents a stationary table supported by standards O, in which table slides a carriage, P. Near the front end of carriage P is pivoted a plate, R, to which is pivoted a smaller plate, S. T represents a disk, which is hinged to the pivoted plate S. Said disk is constructed in two portions, the inner one of which is pivoted to the hinged portion, and provided with the projecting pin U and concave rest V, on which the last is held during the operation. The disk T is connected to the carriage P by a cord, W. X represents a rubber or other spring, which engages with a projection, Y, on the carriage P, and, passing under the table N, holds the carriage P in the position shown. *a* represents a treadle, which is connected to table P by cord *b*, the latter passing through standard *c*, and when depressed draws the table P backward, which table is returned to its former position when the pressure is removed by the spring X. The hinged or jointed tool-carrying frame may be arranged in any suitable position, either as shown in the drawing or above the operator, or on a bench in front, or in any other convenient locality.

By the use of suitable tools the machine may be applied to finishing or operating upon any part of the edge or bottom of a boot or shoe.

The boot-jack may be brought into position for work by means of a rack and pinion instead of the spring and treadle, as above described; but I prefer the last-named arrangement, which, in connection with the sliding-jack holding carriages, may be used with a jack of any suitable construction. The lower end of the arm A is weighted, as shown in Fig. 1, to counterbalance, in a measure, the weight of the upper end of the same.

Power is imparted to the shaft C by any suitable means, and communicated to the shaft E by belts M J and pulleys L K I, thereby revolving the cutter. The boot or shoe attached to its last is placed (in case the jack shown in the drawing is used) on the pivoted portion of disk T, the heel of the last being engaged with the pin U and toe bearing on the concave rest V, the sole of the boot or shoe projecting outward in line with the cutter F, which revolves against the edge thereof and effects the desired finish, which is imparted to all parts of said edge by revolving the pivoted portion of disk T, while the upper of the boot or shoe is protected by the guard or flange G, which projects between the upper and sole, and confines the operation of the cutter-disk strictly to the latter. When the work is placed on or removed from the disk T the latter is laid flat on the carriage P, being hinged, as above mentioned, and swinging freely, and when the operation is being performed the disk is raised to the position shown in Fig. 1, where it is held by the cord W.

It will be readily seen that by means of the swinging or jointed tool-carrying frame, the utmost facility of vertical and horizontal adjustment of the trimming or burnishing tool is obtained, the same being raised or depressed and moved forward or backward at will, the operator grasping the handle *d* which projects from the arm D. The disk T can be adjusted by means of the plates S R so as to present itself diagonally to cutters F, or in a direct line with the same, and admits of a limited lateral play, while, by means of the sliding carriage P and treadle *a*, the work can be drawn backward to any desired extent, thus putting the whole machine perfectly under the control of the operator.

The cutter F can be readily removed from shaft E and another of different form substituted for performing different operations.

By means of the diagonal cutting-edges of sections *f* a shearing cut is produced on the work, which renders the operation easier. The weight *k*, which is attached to the lower end of arm A by screw *k'*, can be caused, by means of said screw, to project further from said arms, thus more readily counterbalancing the same. If desired, the arms D may be provided with a similar attachment.

Having thus fully described my invention, what I claim as new, and desire to secure by Letters Patent, is—

1. The combination, with the jack or support for the shoe, of a flexible or jointed tool-carrying frame, operating substantially as shown and described, and a trimming, burnishing, or other suitable tool mounted thereon, and actuated substantially in the manner herein set forth.

2. The combination of a jack or holder for supporting the boot or shoe with a burnishing or trimming tool carried by levers jointed to move in the plane of, or a plane parallel with, the sole of the shoe or boot, the two being arranged and operating substantially as shown and described, so that the jack and the boot or shoe carried by the same may remain at rest during the movement of the tool, substantially as set forth.

3. In trimming and burnishing machinery organized for operation substantially as specified in the preceding clause, the combination, with the trimming or burnishing tool and its jointed carrying-frame, of a jack movable upon a horizontal axis, and so holding the shoe that it may present the sole in an upright position to the action of the tool, substantially as and for the purposes set forth.

4. The combination, with a trimming or burnishing tool operated by jointed levers, as herein shown and described, of a jack capable of being shifted upon both a horizontal and vertical axis, substantially as herein shown and described, so that the tool may act upon the various portions of the sole-edge and conform to its curves and depressions, substantially as herein shown and described.

5. The combination, with a revolving burnishing or trimming tool, of jointed tool-carrying levers or frame, provided with a system of pulleys and belts or the mechanical equivalent thereof under the arrangement substantially as herein shown and described, whereby the frame may be moved up and down and back and forth while motion is transmitted from some prime mover to the tool through the medium of said pulleys and belts or their mechanical equivalent.

6. The boot jack or holder mounted on a horizontally sliding carriage, and treadle or lever for adjusting the position of the same, substantially as shown and set forth.

7. The combination, with trimming or other tool, and the mechanism for imparting motion to the same, and the flexible or jointed tool-carrying frame, operating as described, of the boot jack or support and the adjustable carriage upon which the same is mounted, under the arrangement substantially as herein shown and set forth.

8. The cutter herein shown and described, consisting of the cutting-sections adjustably connected with their supporting-flange and combined with the shaft from which they receive motion by means of a sleeve and clutch, *e*, substantially as specified.

9. The shoe-holding disk T hinged to the pivoted plates S R, substantially as herein shown and described.

S. H. HODGES.

Witnesses:
THOMAS H. SURZY,
B. F. LARRABEE.